Patented Nov. 1, 1949

2,486,419

UNITED STATES PATENT OFFICE 2,486,419

ALKOXYL LIGNIN HALIDE RESINS AND PROCESS

Raphael Katzen, Eugene, Oreg., assignor, by mesne assignments, to Diamond Alkali Company, Cleveland, Ohio, a corporation of Delaware No Drawing. Application November 15, 1945, Serial No. 628,974

3 Claims. (Cl. 260—124)

This invention relates generally to the art of preparing resinous substances, and more particularly to a method of preparing light-colored, transparent, alkoxyl halide resins and to the resulting compositions.

In the plastics industry light-colored, transparent or translucent resins are generally widely useful and of greater value than dark-colored, opaque resins, which do not lend themselves readily to pigmentation and are unsuited for efficient light transmission. Only dark-colored and opaque lignin resins have been known to the prior art heretofore and there has been, therefore, an unsatisfied demand in the industry for light-colored, transparent or translucent lignin resins which would open new fields to inexpensive, heat-stable lignin resins.

There are two important reasons for the failure of prior efforts to produce such a resin. In the first place, a suitable intermediate raw material has never been prepared, so far as I know, the lignin of the prior art being dark-colored to begin with, and invariably becoming even darker upon resinification. Secondly, no process was known by which a light-colored, transparent or translucent lignin or lignin derivative, if available, could be converted into a resin having the same characteristics.

Light-colored, transparent, low-polymer alkoxyl lignin halides have now been described in copending application Serial Number 647,214, filed February 12, 1946. These substances, unlike other lignin derivatives known to the art, have the light-color and transparency which is desired in the final product and are, therefore, the only lignin derivatives of likely suitability as intermediate raw materials in the preparations of the desired resins.

Alkoxyl lignin halides of this description can be prepared according to the processes described in the aforementioned copending application. As a specific example thereof, methoxyl lignin chloride is prepared by treating a mixture containing lignocellulosic material, methanol, and less than about 5% of water, with chlorine while said mixture is maintained in the temperature range between about 45° C. and about the boiling point of methanol and at a pressure ranging from atmospheric to about 200 pounds per square inch. After about ½ to about 3 hours of this treatment, depending upon the temperature at which the reaction is effected, the methanol is separated from the solid portion of the mixture and introduced into several times its own volume of water. Being water insoluble, the methoxyl lignin chloride dissolved in the methanol precipitates and can readily be separated from the resulting alcohol-water solution.

The term "alkoxyl" is use herein in its usual generic sense and is to be interpreted as meaning methoxyl, ethoxyl, propoxyl, iso-propoxyl, butoxyl or the like. Since natural lignin is known to contain methoxyl groups in varying proportions, depending upon the wood species in which it occurs, but is not known to the art as "alkoxyl lignin," I have used the term "alkoxyl" to indicate modification of natural lignin by addition to the lignin molecule of alkoxyl groups. Thus wherever "alkoxyl lignin halide" is referred to herein a lignin halide is described which contains, in addition to naturally occurring methoxyl groups of the lignin, methoxyl, ethoxyl and/or other alkoxyl groups and contains more alkoxyl groups than the same lignin contains in its natural state.

In attempting to accomplish resinification of alkoxyl lignin halide through polymerization-condensation type reactions conducted according to preferred prior art practices, I found that even by very closely controlling time and temperature conditions, it is impossible to obtain consistently a resinous product having the desired properties and characteristics. However, I have discovered an entirely unique process by which said resinous product can be prepared, and using that process, I have prepared what I believe is the first light-colored, transparent, polymerized, alkoxyl lignin halide resin known to the art. In addition, I found that with the process of my invention, it is possible to produce the desired product without the exercise of very close control over conditions attending the reaction, it being essential only that the proper raw material be used, that the temperature of the reaction be maintained within the range between of about 45° C. and about 150° C. and that adequate time be allowed for the reaction.

Briefly stated, the present invention comprises the step of maintaining a solution of alkoxyl lignin halide in an organic solvent substantially non-reactive therewith under time and temperature conditions ranging between about 45° C. for longer than about 72 hours and about 150° C. for longer than about 4 hours, while said solution is in contact with a polymerization catalyst and is maintained under a halogen atmosphere.

Although I have found it possible to obtain consistently satisfactory results by operating the process for only about 4 hours, I prefer to carry it out over a period of at least 10 hours and preferably in general practice for between about 10 and about 20 hours.

The process of my invention may be carried out in vacuo, at atmospheric pressure, or elevated pressures, with the solvent under reflux in order to control the rate of reaction or to maintain the solvent substance employed in the liquid state.

The invention will be better understood by those skilled in the art from the following illustrative, but not limiting examples.

Example I 10 grams of methoxyl lignin chloride obtained by the above-described process from redwood was dissolved in 100 cc. of methanol. 0.1 gram of benzoyl peroxide was added and the solution was refluxed for twenty-four hours at atmospheric pressure and at 65–70° C. Chlorine gas was bubbled through the solution throughout the reflux period. Approximately two-thirds of the methoxyl lignin chloride charged separated from the methanol as an insoluble transparent yellow resin. The balance of the polymer yield was obtained by pouring the supernatent methanol layer into water, whereupon a resinous material separated.

Example II 100 grams of methoxyl lignin chloride obtained by the above-described process from jack pine was dissolved in 500 cc. of methanol. 1.0 gram of benzoyl peroxide was added and the mixture was refluxed for forty-eight hours at 65–70° C. A practically quantitative yield of methanol insoluble polymer was obtained. No appreciable amount of polymer or methoxyl lignin chloride was found in the supernatent methanol layer.

Example III 25 grams of methoxyl lignin chloride obtained by the above-described process from redwood was dissolved in 250 cc. of methanol. 0.25 gram of benzoyl peroxide was added and the mixture was refluxed for seventy-two hours at 65–70° C. All of the polymer was obtained as a methanol insoluble product.

The foregoing examples set forth certain illustrative raw materials and reaction conditions, but alkoxyl lignin halides from other tree and plant fibers may be used with similar results and under similar conditions. Likewise, other organic solvents or mixtures thereof for the alkoxyl lignin halides may also be used without changing the type of reaction so long as they are not substantially reactive with the said halides during this processing period. Alcohols in addition to methanol which have satisfactory solvent properties include ethanol, n-propanol, iso-propanol and n-butanol. Aldehydes and ketones which are suitable include formaldehyde, actaldehyde, propionaldehyde, benzaldehyde, acetone, hydroxyacetone, methyl ethyl ketone, acetoin, propionone and butyrone. Ethers and esters having satisfactory solvent properties include methyl ether, ethyl ether, n-propyl ether, iso-propyl ether, n-butyl ether, methyl formate, methyl acetate, ethyl formate, ethyl acetate, propyl formate, and methyl propionate. Also fluorine, bromine or iodine may be used instead of chlorine to produce satisfactory results, and they may be used separately or in any admixture with each other and chlorine.

Organic carboxylic acids and anhydrides thereof, being reactive with alkoxyl lignin halides as described in my copending application Serial Number 447,443, filed June 17, 1942, and now abandoned and a continuation-in-part of said application identified as Serial Number 495,625 filed June 21, 1943, now abandoned, are unsuited as solvents for said halides in the present process.

Although benzoyl peroxide is the only catalyst referred to specifically in the examples, other well known polymerization catalysts may be used alternatively or conjointly to accomplish similar results. For instance, aluminum chloride, aluminum fluoride, boron fluoride, titanium tetrachloride, ferric chloride, oxygen, ozone, organic peroxides, organic ozonides, persulfates, percarbonates, perborates, metallic sodium (in different solvents) and mineral acids are suitable as catalysts for the reaction of this process. As those skilled in the art will readily understand, the amount by weight of a given catalytic substance necessary to obtain the desired catalytic result will likely not be the same as the amount required of another such substance to gain the same result. But this does not imply that much experimentation is required to determine the required quantity of a catalyst for use in this process. The polymerization here resembles generally, so far as catalytic action is concerned, other well known polymerizations and, therefore, one practicing the present invention can be guided by knowledge of such other polymerizations in the selection of and the use of the catalytic substance.

Reaction conditions may be varied with regard to time of reflux, temperature and pressure, so as to control the rate and degree of polymerization. Extending the time of reflux results in more complete polymerization of the lignin halide and has a bearing upon stability, as will be seen by comparison of Example II with Example I. Generally, an increase in temperature and/or pressure reduces the time required for complete polymerization by increasing the rate.

The alkoxyl lignin halide polymers thus obtained are useful for many purposes, as, for example, in plastics, and as base materials for varnishes and coatings for paper, and other materials.

The foregoing reactions may be carried out in any suitable apparatus for example in a closed reaction vessel which may be steam jacketed and preferably is provided with mixing blades. It should have a vapor-reflux duct at its top, the vapor duct leading to an overhead condenser from which the condensate constantly returns to the vessel. For reduced pressures a usual type of vacuum pump may be connected to the top of the condensing tube. Such apparatus is standard in the resin art.

In this specification and in the appended claims percentage and proportions are expressed on the weight basis.

This application is a continuation-in-part of application Serial No. 495,626, filed July 21, 1943, now abandoned.

Having thus described the present invention so that others skilled in the art may be able to understand and practice the same, I state that what I desire to secure by Letters Patent is defined in what is claimed.

What is claimed is:

1. The method of preparing light-colored, transparent to translucent, thermoplastic alkoxyl lignin chloride resins which comprises the step of refluxing a methanol solution of methoxyl lignin chloride at a temperature of less than about 150° C. for between about 10 hours and about 20 hours, while said solution is in contact with benzoyl peroxide and is under a chlorine atmosphere.

2. The method of preparing light-colored, transparent to translucent thermoplastic methoxyl lignin chloride resins which comprises the step of refluxing a methanol solution of methoxyl lignin chloride at a temperature of less than about 150° C. for between about 10 hours and about 72 hours, while said solution is in contact with benzoyl peroxide and is under a chlorine atmosphere, and then boiling off the methanol at a temperature below about 150° C.

3. The method or preparing light-colored, transparent to translucent, thermoplastic methoxyl lignin chloride resins which comprises the steps of refluxing a methanol solution of methoxyl lignin chloride at a temperature less than about 150° C. for between about 10 hours and about 72 hours, while said solution is in contact with benzoyl peroxide and is under a chlorine atmosphere, separating and recovering the resulting insoluble resinous material, mixing the remaining solution with more than its volume of water and separating and recovering the resinous material which separates.

RAPHAEL KATZEN.

REFERENCES CITED

The following references are of record in the file of this patent:

UNITED STATES PATENTS

| Number | Name | Date |
| --- | --- | --- |
| 2,212,866 | Sherrard | Aug. 27, 1940 |

OTHER REFERENCES

Jansen: Canadian Jour. of Research, vol. 15B, pp. 279–294 (1937).

Powel: Jour. Chem. Soc., vol. 125, pp. 357–364 (1924).

Friedrich: Biochem, Zeit., vol. 239, pp. 461–472 (1931).

Muller: Der Papierfabrikant, Technisch-Wissenschaftlicher Teil, vol. 37 pp. 237–240 (1939).